(12) United States Patent
Werner et al.

(10) Patent No.: US 12,234,861 B2
(45) Date of Patent: Feb. 25, 2025

(54) BEARING STRUCTURE COMPONENT

(71) Applicant: Vibracoustic SE, Darmstadt (DE)

(72) Inventors: Philipp Werner, Lüneburg (DE); Hilrich Kardoes, Winsen (DE)

(73) Assignee: Vibracoustic SE, Darmstadt (DE)

( * ) Notice: Subject to any disclaimer, the term of this patent is extended or adjusted under 35 U.S.C. 154(b) by 215 days.

(21) Appl. No.: 17/772,378

(22) PCT Filed: Apr. 24, 2020

(86) PCT No.: PCT/EP2020/061465
§ 371 (c)(1),
(2) Date: Apr. 27, 2022

(87) PCT Pub. No.: WO2021/083556
PCT Pub. Date: May 6, 2021

(65) Prior Publication Data
US 2022/0373025 A1     Nov. 24, 2022

(30) Foreign Application Priority Data
Oct. 30, 2019 (DE) .......................... 202019106036.0

(51) Int. Cl.
*B60G 7/00* (2006.01)
*B60G 15/06* (2006.01)
(Continued)

(52) U.S. Cl.
CPC ............ *F16C 31/02* (2013.01); *B60G 15/068* (2013.01); *F16C 35/02* (2013.01); *F16C 43/02* (2013.01);
(Continued)

(58) Field of Classification Search
CPC ........ F16C 2326/05; B60G 2206/8201; B60G 2206/7101; B60G 2206/7104; B60G 2206/7105
See application file for complete search history.

(56) References Cited

U.S. PATENT DOCUMENTS 4,650,620 A    3/1987 Owen et al.
5,915,436 A *  6/1999 Johnson ................. B24D 13/10
                                                      15/187

(Continued)

FOREIGN PATENT DOCUMENTS

CN    102019968 A    4/2011
CN    107013561 A    8/2017
(Continued)

OTHER PUBLICATIONS

EP Examination Report and English Translation of European Examination Report for EP20722287.8-1009. (14 pages) Mar. 3, 2023.
(Continued)

*Primary Examiner* — Paul N Dickson
*Assistant Examiner* — Maxwell L Meshaka
(74) *Attorney, Agent, or Firm* — Fishman Stewart PLLC

(57) ABSTRACT

A bearing structure component for a vehicle bearing, having at least one through-opening for receiving a connecting element or a bearing which is made of foamed synthetic material, and the foamed synthetic material forms an integral foam structure. In an embodiment, at least one first local section of the integral foam structure has a wall thickness of greater than 4 mm.

20 Claims, 8 Drawing Sheets

(51) Int. Cl.
   *F16C 31/02* (2006.01)
   *F16C 35/02* (2006.01)
   *F16C 43/02* (2006.01)
(52) U.S. Cl.
   CPC ............... *B60G 2206/7101* (2013.01); *B60G 2206/7104* (2013.01); *B60G 2206/7105* (2013.01); *B60G 2206/8201* (2013.01); *F16C 2208/20* (2013.01); *F16C 2226/36* (2013.01)

(56) References Cited

U.S. PATENT DOCUMENTS

| | | | | |
|---|---|---|---|---|
| 6,770,158 | B2* | 8/2004 | Hartley | B29C 66/43421 156/64 |
| 7,201,963 | B2* | 4/2007 | Hartley | B29C 66/114 428/411.1 |
| 8,652,611 | B2 | 2/2014 | Gaudig et al. | |
| 9,964,145 | B2 | 5/2018 | Lepine et al. | |
| 10,589,588 | B2* | 3/2020 | Souschek | B22F 10/38 |
| 2003/0150543 | A1* | 8/2003 | Hartley | B29C 66/43421 156/64 |
| 2004/0038023 | A1* | 2/2004 | Hartley | B29C 66/43421 428/341 |
| 2007/0184279 | A1* | 8/2007 | Hartley | B29C 66/73921 428/521 |
| 2016/0059514 | A1* | 3/2016 | Perick | B32B 5/20 428/152 |
| 2016/0121650 | A1 | 5/2016 | Peters | |
| 2017/0219038 | A1 | 8/2017 | Bedeau et al. | |
| 2018/0154720 | A1* | 6/2018 | Souschek | B60G 7/008 |
| 2020/0025253 | A1* | 1/2020 | Werner | F16C 17/10 |
| 2021/0131489 | A1* | 5/2021 | Werner | B60G 15/068 |
| 2021/0148407 | A1* | 5/2021 | Werner | B60G 11/16 |
| 2021/0252506 | A1* | 8/2021 | Podbiel | B01L 3/527 |
| 2022/0112936 | A1* | 4/2022 | Rose | F16F 15/08 |
| 2022/0373025 | A1* | 11/2022 | Werner | B60G 15/068 |
| 2023/0287931 | A1* | 9/2023 | Kardoes | F16F 3/0876 |
| 2023/0375038 | A1* | 11/2023 | Kardoes | F16C 27/06 |

FOREIGN PATENT DOCUMENTS

| | | | | |
|---|---|---|---|---|
| CN | 114667225 | A * | 6/2022 | ........... B60G 13/003 |
| DE | 102016204015 | A1 | 9/2017 | |
| DE | 202019106036 | U1 * | 1/2020 | ........... B60G 13/003 |
| EP | 3199390 | A1 | 8/2017 | |
| JP | S5889409 | A | 5/1983 | |
| JP | 2005132308 | A | 5/2005 | |
| WO | 17/045978 | A1 | 3/2017 | |
| WO | WO-2021083556 | A1 * | 5/2021 | ........... B60G 13/003 |
| WO | WO-2022073814 | A1 * | 4/2022 | |

OTHER PUBLICATIONS

Andreas Handschke et al.: "Thermoplast-Schaumspritzgieben: Physikalisches Schäumen ganz leicht gemacht", Kunststoffee, Carl Hanser Verlag, Munchen DE, Oct. 1, 2012 (Oct. 1, 2012), Seiten 151-156, Xo002739603, ISSN: 0023-5563 das ganze Dokument.
Effect of Process Conditions on the Weld-Line Strength and Microstructure of Microcellular Injection Molded Parts; Lih-Sheng Turng and Hrishikesh Kharbas; Polymer Enginerring and Science, Jan. 2003, vol. 43, No. 1.
Production and Properties of Injection Molded Magnesium Integral Skin Foams; The Technical Faculties of the University of Erlangen des Grandes; Markus Hirschmann, Erlangen—2007; pp. 1-21.
International Search Report, PCT/EP2020/061465, dated Aug. 4, 2020.
English machine translation of Integralschäume_Neue Materialien_ Bayreuth Nov. 13, 2016; Spritzgegossene Integralschäume mit hoher Biegesteifigkeit und hochwertigen Oberflächen; Injection Molded Integral Foams with High Bending Stiffmess and High Quality Surfaces; Way Back Machine, May 5, 2015-Nov. 13, 2016; 1 page with English Translation.
First Office Action for related CN202080075676.0 Application with English Translation (15 pages) Nov. 6, 2023.

* cited by examiner

BEARING STRUCTURE COMPONENT

CROSS-REFERENCE TO RELATED APPLICATIONS

This application is a National Stage Patent Application of International Patent Application No. PCT/EP2020/061465, filed Apr. 24, 2020, which claims the benefit of German Application Serial No. 20 2019 106 036.0, filed Oct. 30, 2019, the contents of each are incorporated by reference in their entireties.

TECHNICAL FIELD

The invention relates to a bearing structural component for a bearing component of a vehicle, including a motor vehicle.

BACKGROUND

In vehicle construction, in particular in automotive construction, it is sometimes the case that increasing amounts of metal are replaced by injection-molded plastic to reduce weight, including in bearing structural components. In order to construct plastic satisfactorily and to minimize cycle times and weight, such components are generally manufactured in the form of a ribbed structure. To achieve high material strength and a high modulus, in bearing structural components use is generally made of fiber-reinforced polymers.

Bearing structural components, in particular sandwich bearing structural components, are known in aircraft, boat and other lightweight construction. Lightweight cores, e.g. composed of honeycomb structures or else of foams with a thin, usually continuous-fiber-reinforced cover layer on the top side and bottom side, have proven to be successful here. In this respect, the thickness of the core material has a significant impact on the flexural stiffness of the overall component, since the thickness significantly determines the area moment of inertia that affects flexion. The core primarily transfers shear forces between the covering layers in the event of flexural loading. By contrast, tensile and compressive loads are transferred almost exclusively by the outer cover layers.

However, ribbed structures made of fiber-reinforced polymers have the disadvantage that they have a tendency toward shrinkage and distortion, in particular also toward indentations at material accumulations, such as rib intersection points. In addition, the residual cooling time and wall thickness have a quadratic-function relationship, and therefore the wall thicknesses are limited if plastics parts are to be manufactured economically. Conventional large wall thicknesses are therefore no greater than 4 mm, and substantially larger wall thicknesses are used only in exceptional cases. Furthermore, confluence zones result in inhomogeneous material microstructures and consequently the material properties are not exploited optimally.

If there are also functional surfaces on the component that require e.g., a high degree of flatness or cylindricity, the position of the indentations and the precise allowance of shrinkage and distortion are even more critical. Such requirements for high evennesses, for example in the region of sealing seats, for example at hydraulic bearings, at seats for bearing elements, such as plain and ball bearings, can exist where impression edges are provided for further processing of the components by vulcanization or in the case of surfaces to be welded.

Bearings, in particular elastomer bearings, of a vehicle, in addition to the function of elastically connecting two components to one another and defining their kinematics in relation to one another, generally also have the task of damping vibrations or, in the case of hydraulic bearings, eliminating them by means of hydraulic systems or isolating excitations of vibration. Although the damping in a non-hydraulic bearing is significantly influenced by the damping of the elastomer, the material of e.g. housing parts can also considerably contribute to damping.

One of the most important paths by which noise is transferred into the vehicle structure is via what are known as strut bearings, also referred to as top mounts. High damping of this assembly is therefore advantageous in acoustic terms.

SUMMARY

The present invention can provide a bearing structural component for a bearing of a vehicle that has high flexural stiffness combined with little material usage and a short cycle time during production and at the same time provides high precision and uniform geometry.

To provide such advantages, a bearing structural component having features as dis-closed in embodiments herein is proposed.

The disclosure includes advantageous embodiments of bearing structural components.

A bearing structural component for a bearing, in particular for an elastomer bearing and/or an additional spring, of a vehicle, in particular a motor vehicle, having at least one through-opening for receiving a connecting element or a bearing, consists of foamed plastic, wherein the foamed plastic forms an integral foam structure, wherein at least a first local portion of the integral foam structure has a wall thickness of greater than 4 mm.

Since the bearing structural component is produced from foamed plastic which forms an integral foam structure, ribs can be largely dispensed with. Furthermore, due to its high local wall thickness, the bearing structural component has a very high area moment of inertia, which determines the flexural stiffness, in a similar way to the sandwich structures mentioned in the introduction. As a result, the bearing structural component has a high component stiffness with respect to flexural loading. In addition, the bearing structural component has good damping properties on account of the foam.

In the injection molding of bearing structural components having at least one through-opening, at least one weld line, which is arranged in a confluence zone or weld line zone, is respectively produced in the region of the through-opening by confluence of the injected plastic. Surprisingly, it was found that through the strength of the weld line brought about by the through-opening is higher than would be expected from a foamed weld line. Its strength is higher than if the usual reduction factors for calculating the weld line strength were to be applied to the foam strength. This is due to the fact that, in the respective weld line zone, there is a higher density than the mean density of the foamed bearing structural component. This results in a higher density and consequently higher local strength around or close to the at least one through-opening. It was consequently established that the introduction of a through-opening into a foamed, injection-molded component can be utilized to set a locally targeted increase in density.

Through-openings of the type described above are frequently used in structural components to receive load-bearing elements, such as attachment elements, threaded inserts or elastomer bearings, for example. Therefore, the weld lines in the component classes according to the invention are naturally subject to especially high loading. By contrast, other regions in the components are frequently overdimensioned in terms of their strength. The introduction of through-openings into components foamed by injection molding therefore makes it possible to targetedly provide attachment regions with a higher density, with the result that high strength is achieved locally there, whereas the other, frequently overdimensioned regions lose strength due to the foaming. Therefore, by introducing through-holes in the region of attachment points that are subject to high loading, the targeted density adaptation results in optimized utilization of material overall.

A weld line is produced in each case behind a through-opening. In this respect, the spatial orientation is based on an injection point of the foamed plastic. The injection point is thus arranged in front of the through-opening.

The at least one through-opening for receiving a connecting element or a bearing allows the bearing structural component to be connected to a vehicle part by way of the corresponding connecting element or the bearing.

The bearing structural component may be in the form of a top mount housing, differential bearing adapter, transmission cross bridge, hinged support, coupling rod, chassis link, engine bearing housing or engine bearing support arm. Furthermore, it may be a housing structure of an elastomer bearing or a load-transferring structure directly connected to an elastomer bearing.

In an advantageous embodiment, the foamed bearing structural component is manufactured in one manufacturing step. In this respect, the foam is not prefabricated and reinforced in further method steps with covering layers, but rather a foam core and a covering layer are produced in one processing step by foam injection molding, for example by the MuCell method.

In an advantageous embodiment, the first local portion has a wall thickness of greater than 10 mm, in particular greater than 20 mm. As a result, the bearing structural component has a high area moment of inertia and therefore high flexural stiffness. According to the invention, it has been found that, in the case of a foam structure subject to tensile and compressive loading, porosities of greater than 10% considerably detrimentally affect the strength and stiffness, but that under flexural stress the foam is subject to considerably lower loading and is primarily subject to shear forces. Consequently, considerably higher wall thicknesses, of at least 10 mm, and core zones with a higher porosity, of greater than 10%, in particular of greater than 20%, are advantageous in the bearing structural components. Thus, according to the invention, it has been found that, for the MuCell method, unusually large wall thicknesses of greater than 10 mm, preferably greater than 20 mm, which local porosities of greater than 10%, preferably greater than 20%, in combination with compact covering layers at a porosity of less than 10%, are advantageous for use in bearing structural components for vehicle construction, in particular motor vehicle construction, as top mounts, differential bearing sup-ports, transmission cross bridges or engine bearings, in order to achieve high flexural stiff-nesses with a given material usage. The wall thickness can also be referred to as wall depth. Advantageously, the first local portion is formed from the core and the covering layer.

In an advantageous embodiment, the integral foam structure has a first layer having a first porosity and a second layer having a second porosity, wherein the second layer is surrounded by the first layer. The first layer advantageously has high compressive and tensile strength and stiffness. The second layer is thicker than the first layer and is subjected purely to shear forces under flexural loading. The first layer can also be referred to as covering layer or cover layer. The second layer can also be referred to as core or core layer. The core is surrounded by the covering layer in such a way that the core is arranged between a first covering layer and a second covering layer as seen in cross section.

The second porosity is greater than or equal to the first porosity. As a result, the covering layer has high compressive and tensile strength and stiffness. Since the core layer in the bearing structural component connects the cover layers, which are subjected primarily to tensile and compressive loading by the flexural loading, the core is subjected primarily to shear forces. To improve the flexural stiffness of the bearing structural component, for a given component weight the thickness of the core should be increased correspondingly to its porosity until the necessary shear stiffness and shear resistance of the foamed plastic is optimally utilized. To obtain a covering layer that is as compact as possible, it is advantageous if the foamed plastic on the wall of the injection molding tool cools down quickly.

In an advantageous embodiment, the first porosity is less than or equal to 10%. On account of the low porosity, the first layer has high compressive and tensile strength and stiffness.

In an advantageous embodiment, the second porosity is greater than 10%, in particular greater than 20%. As a result, the core layer has a sufficiently low density with sufficiently high shear resistance and shear stiffness.

In an advantageous embodiment, the first layer has a thickness of greater than 1 mm, in particular greater than 2 mm. This provides a very compact covering layer in which the porosity is at most 10% on average. As a result, the first layer has high compressive and tensile strength and stiffness.

In an advantageous embodiment, the bearing structural component has a second local portion that can be connected to a further component by a welding method, in particular by laser plastic transmission welding. Advantageously, the second local portion can be connected to a further component, for example a cover or a reinforcement structure, by laser plastic transmission welding. For this purpose, the second local portion in the region of the weld seam requires a small wall thickness, which is advantageously between approx. 1 mm and approx. 4 mm and consists of a material that neither strongly absorbs nor scatters a laser beam provided for the welding operation, but is laser-transparent enough that the plastic can be melted in the welding plane. According to the invention, laser-transparent is defined as at least 5% of the laser beam power output reaching the welding plane of the first component. In this case, the corresponding portion of the partner to be welded that forms the weld seam has high laser absorptance, so that the energy of the laser does not leave the weld zone.

In an advantageous embodiment, the second local portion has a wall thickness of between approx. 1 mm and approx. 4 mm. It is possible for the second local portion to be formed only from the first layer. It is also possible for the second portion to be formed from the first layer and the second layer. The wall thickness can also be referred to as wall depth.

In an advantageous embodiment, either the second local portion has high laser transmittance and the corresponding edge portion of the further component has high laser absorptance, or the second local portion has high laser absorptance and the corresponding edge portion of the further component has high laser transmittance. If the second local portion has high laser absorptance, the component to be welded to the bearing structural component must have high laser transparency so that the laser can penetrate this component and enter the bearing structural component. If the second local portion has high laser transparency, the component to be welded to the bearing structural component must have high laser absorptance so that the laser can penetrate the second portion and enter the component.

The integral foam structure of the bearing structural component has at least one through-opening for receiving a connecting element or a bearing. In an advantageous embodiment, the connecting element is in the form of a sleeve, the end of which is provided with a collar in an advantageous embodiment. The sleeve is advantageously a metal sleeve with an internal thread for screwed connection to a vehicle part. In an advantageous embodiment, the bearing is an elastomer bushing, which has a core and an elastomer body surrounding the core. The elastomer bushing may furthermore advantageously have an outer sleeve. The outer sleeve may be made of metal or plastic.

In an advantageous embodiment, the integral foam structure of the bearing structural component has three or four through-openings for receiving connecting elements and one or two through-openings for receiving a respective bearing. In this case, each through-opening has at least one weld line in a weld line zone.

In an advantageous embodiment, the connecting element or the bearing is connected to the integral foam structure in a form-fitting, force-fitting and/or materially bonded manner. The connecting element or the bearing may be pressed in the through-opening. Furthermore, the connecting element or the bearing may be materially bonded to the bearing structural component by placing the connecting element or the bearing into an injection mold and then forming the plastic around it in a foamed encapsulation. Likewise, the connecting element may be screwed or advantageously embedded by ultrasound in the through-hole.

In an advantageous embodiment, at least one weld line zone is formed in the region of each through-opening. In this region, the weld line zone has a higher density than the mean density of the bearing structural component. The strength is increased in this region of confluence of the foamed plastic. At least one respective weld line is formed in the at least one weld line zone. Since a plastics melt containing a blowing agent has a lower viscosity than a melt without a blowing agent and therefore has improved flow behavior, a particularly short injection time or filling time of the mold can be realized. By virtue of the short injection time, the melt has a tendency to be hotter when it reaches the regions remote from the gate than with longer filling times. Since the weld line strength depends directly on the merging of the melt fronts involved, a hotter melt front, caused by faster injection achievable by virtue of the lower viscosity of the melt on account of containing a blowing agent, results in a higher weld line strength. Consequently, in particular weld lines remote from the gate can be produced with high strength in components produced by foam injection molding if the weld lines are behind a through-opening, which in the weld line zone results in an increased density compared to the mean density of the component.

Thus, the strength of the at least one weld line zone in the region of the through-opening is increased as a result of the improved flow behavior of the plastics melt containing the gas. As a result, the bearing structural component in the region of the through-opening has sufficient strength for the insertion of a connecting element or a bearing or for the fastening of the bearing structural component to a vehicle part via the connecting element or the bearing. The weld line zone or the weld line is produced at the confluence zone of the foamed plastic. The strength of the weld line zone is enhanced by the lower viscosity of the foamed plastic due to the foamed plastic containing gas, which allows a faster filling time. The weld line zone is produced behind the through-opening as seen from the injection point of the foamed plastic. The weld line zone may have a multiplicity of weld lines. If the bearing structural component has multiple through-openings, at least one weld line zone, the strength of which is increased due to the foamed plastic, is formed in the region of each through-opening, in particular behind each opening as seen from the injection point.

In an advantageous embodiment, the foamed plastic is a thermoplastic material, in particular a fiber-reinforced thermoplastic material. A fiber-reinforced plastic has high stiffness and the fibers moreover act as nucleating agents for the pores that form. This achieves an especially uniform, fine pore structure. In particular, a uniform distribution of fine fibers due to uniform nucleation results in an optimum pore structure of the integral foam structure.

In an advantageous embodiment, the integral foam structure is produced by the MuCell method. This reduces shrinkage and distortion. This is possible because a high gas pressure, which can be approx. 30 bar, prevails in the melt. After the edge layer forming the covering layer has solidified, this internal pressure then results in uniform pore formation instead of the formation of individual large shrinkage holes. At the same time, however, the gas also reduces the viscosity of the melt, with the result that the injection pressure can be considerably reduced and longer flow paths are possible. The molds are underfilled depending on the porosity or target weight that is to be set. It is possible to dispense with the hold pressure completely, since the gas pressure from the blowing agent is sufficient to prevent shrinkage and distortion and to promote pore formation. In comparison with conventional injection molding methods, the MuCell method has the advantage that a considerably reduced tool closing force is required, which means that small and inexpensive machines can be used.

In an advantageous embodiment, the bearing structural component has a first receiving portion for receiving a first bearing element and/or a second receiving portion for receiving a second bearing element. The first receiving portion and/or the second receiving portion may be in the form of a receiving opening, formed in the bearing structural component, for inserting a first bearing element and/or a second bearing element. Furthermore, the first receiving portion and/or the second receiving portion may be in the form of a seat for a bearing element, for example a plain bearing or a ball bearing. The first receiving portion and/or the second receiving portion are/is advantageously formed in such a way that the first bearing element and/or the second bearing element are/is received in a form-fitting and/or force-fitting manner. In addition, the bearing structural component may have a third receiving portion for receiving a third bearing element, which is in the form of a seat for a bearing, such as a plain bearing or ball bearing, for example. The first bearing element may be in the form of an elastomer bearing, the second bearing element may be in the form of an additional spring, for example made of PU foam.

In an advantageous embodiment, at least one of the bearing elements is connected to the bearing structural component in a form-fitting, force-fitting and/or materially bonded manner. In order to integrate the bearing element in the bearing structural component, the bearing element is fastened to the bearing structural component by a force fit, material bond and/or form fit after being inserted into the receiving portion. The integral foam is advantageous in particular for the material bond and the form fit. Plastic welding methods thus play an important role in fixing the bearing element. On the one hand, a cover element or a ring element may be welded to the bearing structural component in order to hold the bearing element in the receiving portion by a form fit. On the other hand, the bearing element may be adhesively bonded to the bearing structural component by way of a plastics structure, e.g. an outer sleeve. Advantageously, the plastics structure of the bearing element is welded directly to the bearing structural component. In most plastic welding methods, e.g. laser plastic transmission welding, ultrasonic welding, friction welding or hot gas welding, a high degree of evenness in the weld zone promotes the weld seam strength. Due to the integral foam structure, the bearing structural component has low distortion and thus outstanding evenness and ultimately a high weld seam strength.

In an advantageous embodiment, at least one of the receiving portions may be closed by a cover element or ring element in order to secure the bearing element that is received in the receiving portion. The bearing element may be fixed to the bearing structural component by the cover element or the ring element. The cover element or the ring element may be fastened to the bearing structural component by a force fit, material bond and/or form fit. Advantageously, the cover element or the ring element is welded to the bearing structural component. For welding purposes, it is advantageous if the cover element or the ring element is made of plastic.

The bearing structural component preferably has a wall thickness of <4 mm in the region of the weld zone for laser plastic transmission welding purposes. Furthermore, it is advantageous if the bearing structural component has a low fiber content in the region of the weld zone. The use of ultrasonic welding, friction welding or laser plastic transmission welding generates only very local heat in the weld zone, with the result that a bearing element inserted close to the weld zone is scarcely at risk of damage from the heat input.

In an advantageous embodiment, the bearing structural component is part of a bearing, in particular part of a top mount, an assembly bearing or engine bearing support arm, a link, in particular a chassis link, a coupling rod, a hinged support or a transmission suspension, or is an attachment part for a bearing, or is a part that receives a bearing. The assembly bearing may be an engine bearing or a transmission bearing.

BRIEF DESCRIPTION OF THE DRAWINGS

The bearing structural component and further features and advantages are explained in more detail below with reference to exemplary embodiments that are illustrated schematically in the figures, in which.

DETAILED DESCRIPTION

Figure 1:
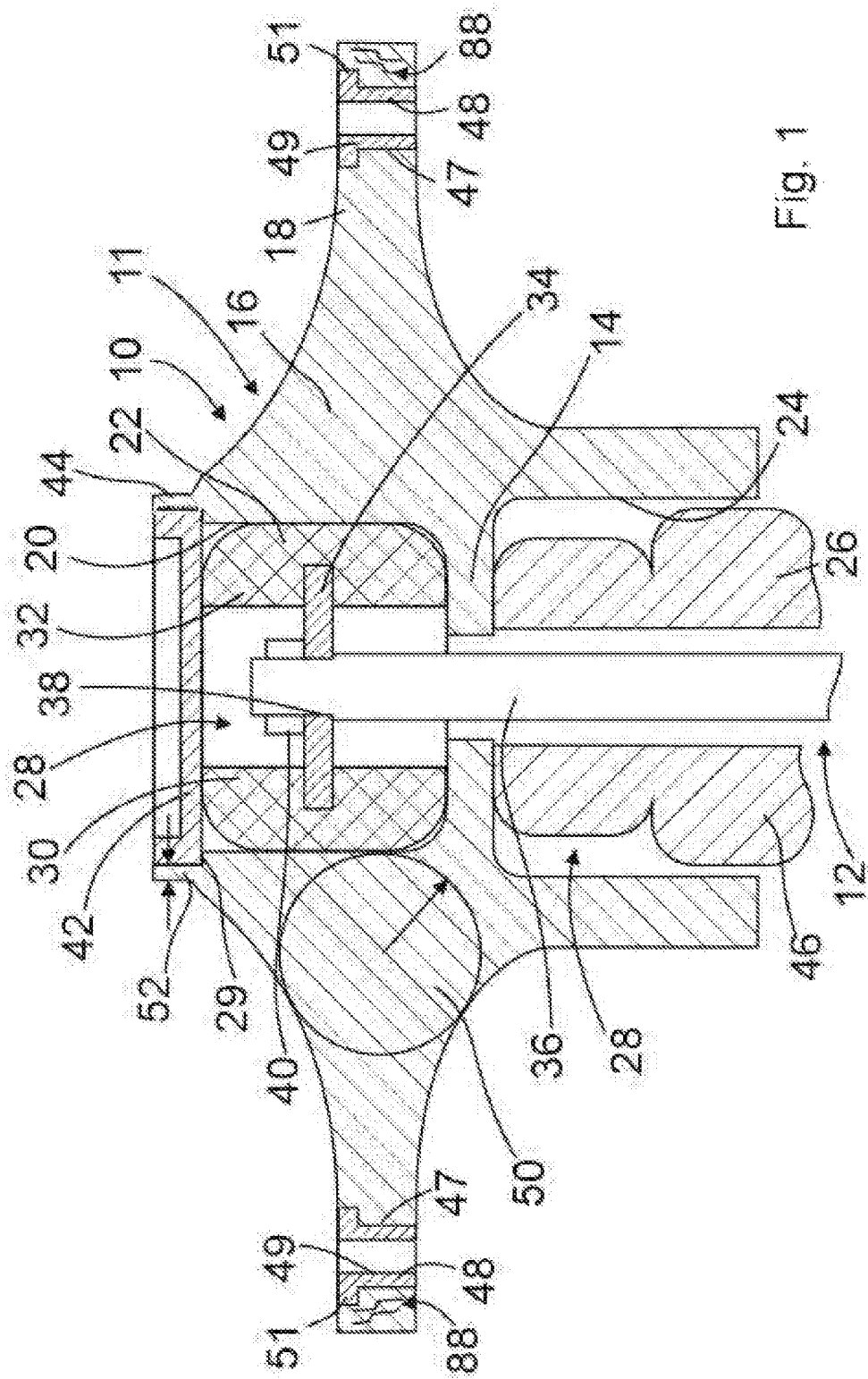
FIG. 1 shows a cross section through a bearing structural component according to a first embodiment.

FIG. 1 shows a bearing structural component 10 according to a first embodiment, which is in the form of a strut bearing or top mount 11. A shock absorber 12 is mounted on a vehicle structure, which is not illustrated, such as a vehicle bodyshell, for example, via the top mount 11.

The top mount 11 is produced from foamed plastic, in particular fiber-reinforced foamed plastic, by a foam injection molding method, in particular the MuCell method.

Figure 2:
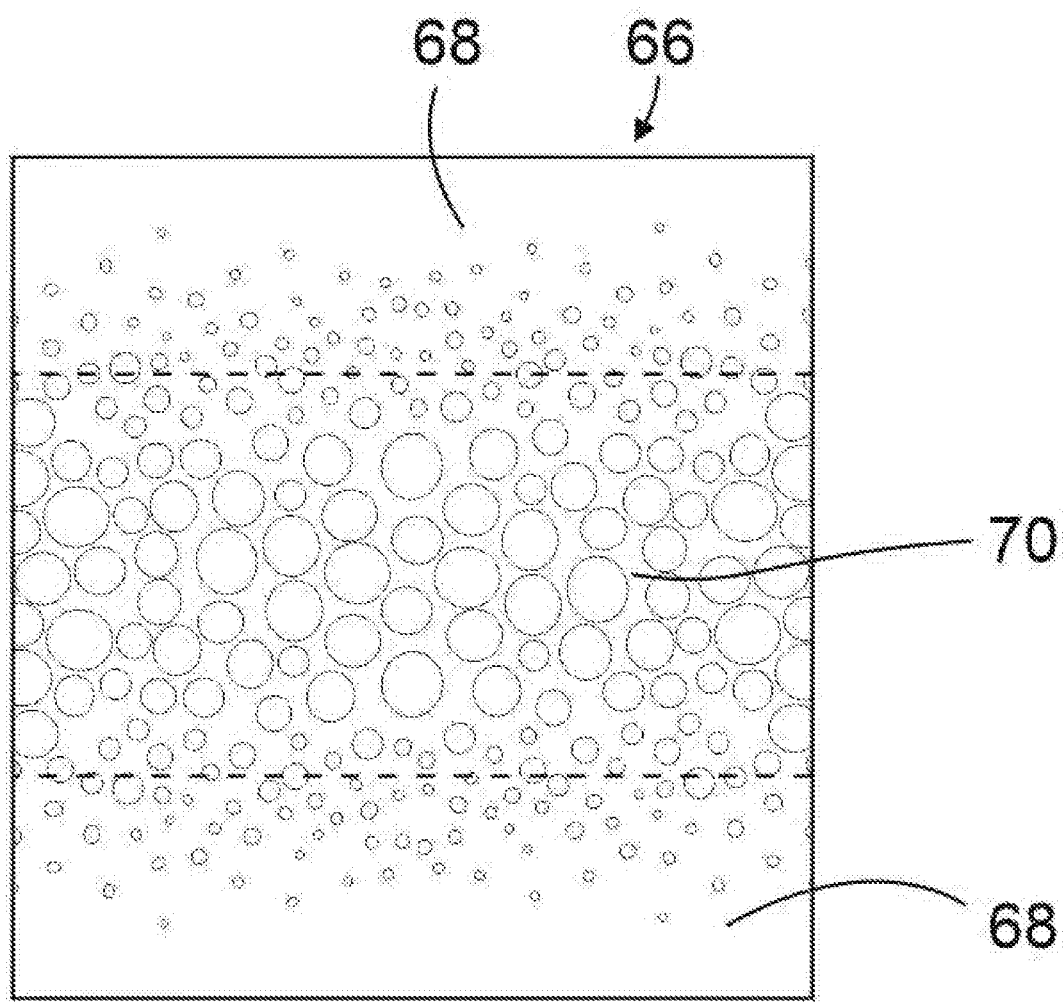
FIG. 2 shows an enlarged cross section through the integral foam structure.

As can be seen in FIG. 2, the foamed plastic forms an integral foam structure 66 which has a first layer 68 having a first porosity and a second layer 70 having a second porosity, the second layer 70 being surrounded by the first layer 68. The first layer 68 may also be referred to as covering layer or cover layer and the second layer 70 may also be referred to as core or core layer. The first layer 68 has a thickness of greater than 1 mm, in particular greater than 2 mm, the mean first porosity being less than or equal to 10% and the mean second porosity being greater than 10%, in particular greater than 20%.

The top mount 11 comprises a main body portion 14 and two transition portions 16 protruding from the main portion 14, each of the transition portions 16 leading into a flange portion 18.

The main portion 14 has a first receiving portion 20 for receiving a first bearing element 22 and a second receiving portion 24 for receiving a second bearing element 26. The two receiving portions 20, 24 are in the form of receiving openings 28.

As can be seen in FIG. 1, the first bearing element 22 is an elastomer bearing 30 which is inserted, in particular pressed, in the first receiving portion 20 or the receiving opening 28 and which mounts the shock absorber 12 elastically on the vehicle structure.

The elastomer bearing 30 has an elastomer body 32 and a metal disk 34. A damper rod 36 of the shock absorber 12 is fastened to the metal disk 34. For this, the free end of the damper rod 36 is guided through an opening 38 made in the metal disk 34 and is connected to the metal disk 34 by a fastening element 40. In the present case, the fastening element 40 is in the form of a nut, which can be screwed onto a thread of the damper rod 36.

As can also be seen in FIG. 1, the elastomer bearing 30 is held in the first receiving portion 20 by a cover element 42. For this, the cover element 42 is inserted in the receiving opening 28 of the first receiving portion 20 in such a way that it comes to bear against a circumferential projection 29 of the first receiving portion 20. In order to fasten the cover element 42 to the bearing structural component 10, the cover element 42 is welded to a second local portion 52 of the bearing structural component 10. In the present case, the second local portion 52 is in the form of a thin-walled edge portion 44 having a wall thickness between approx. 1 mm and approx. 6 mm. The cover element 42 is preferably welded to the edge portion 44 by laser plastic transmission welding. This requires that either the cover element 42 or the edge portion 44 is made of plastic and has high laser transmittance, whereas the respective other partner to be welded, that is to say the edge portion 44 or the cover element 42, has high laser absorptance.

As can be seen in FIG. 1, an additional spring 46, through which the damper rod 36 extends, is inserted in the receiving opening 28 of the second receiving portion 24. The additional spring 46 may be produced from a PU foam.

Each of the flange portions 18 has a through-opening 47 in which a respective connecting element 48 is inserted. The bearing structural component 10 may be screwed to a vehicle structure, which is not illustrated, via the connecting elements 48. The connecting elements 48 are in the form of sleeves 49 with a collar 51, which is arranged at the end and is made of metal, for screwed connections, in order to discharge the reaction forces to the vehicle structure, which is not illustrated.

As can be seen in FIG. 1, weld line zones 88, which are produced at the confluence zone of the foamed plastic, are formed in the region of the through-openings 47. The weld line zones 88 are produced behind the through-openings 47 as seen from the injection point for the foamed plastic. The strength of these weld line zones 88 is enhanced by the low viscosity of the foamed plastic due to the foamed plastic containing gas, which allows a faster filling time.

During use as intended, the shock absorber 12 subjects the middle of the bearing structural component 10 primarily to tensile and compressive loading. The reaction forces are discharged to the flange portions 18 via the connecting elements 48. As a result, the entire bearing structural component 10 is subjected to flexural loading. In order to achieve the highest possible flexural stiffness, the transition portion 16 has a first local portion 50, illustrated here by the depicted circle, which gets bigger toward the center until it reaches a maximum. At maximum, the first local portion 50 has a wall thickness of greater than 10 mm, in particular greater than 20 mm. Due to the large wall thickness, the area moment of inertia, which determines the flexural stiffness, is very high, with the result that the component stiffness with respect to flexural loading of the bearing structural component 10 is very high.

Since the first layer 68 has a porosity of less than or equal to 10%, it has a high compressive and tensile strength and stiffness. The second layer 70, which in the bearing structural component 10 connects the first layers 68, which are subjected primarily to tensile and compressive loading by the flexural loading, is subjected primarily to shear forces, however. For the flexural stiffness of the bearing structural component 10, it is therefore advantageous for a given component weight to increase the thickness of the second layer 70, that is to say the core and correspondingly its porosity, until the necessary shear resistance and stiffness of the foamed plastic are optimally utilized. Due to the large wall thickness of the first local portion 50, the flexural stiffness of the bearing structural component 10 is very high, thereby resulting in increased component stiffness with respect to flexural loading.

Further exemplary embodiments for the bearing structural component 10 are described below, the same reference signs being used for identical parts and parts which have the same function.

Figure 3:
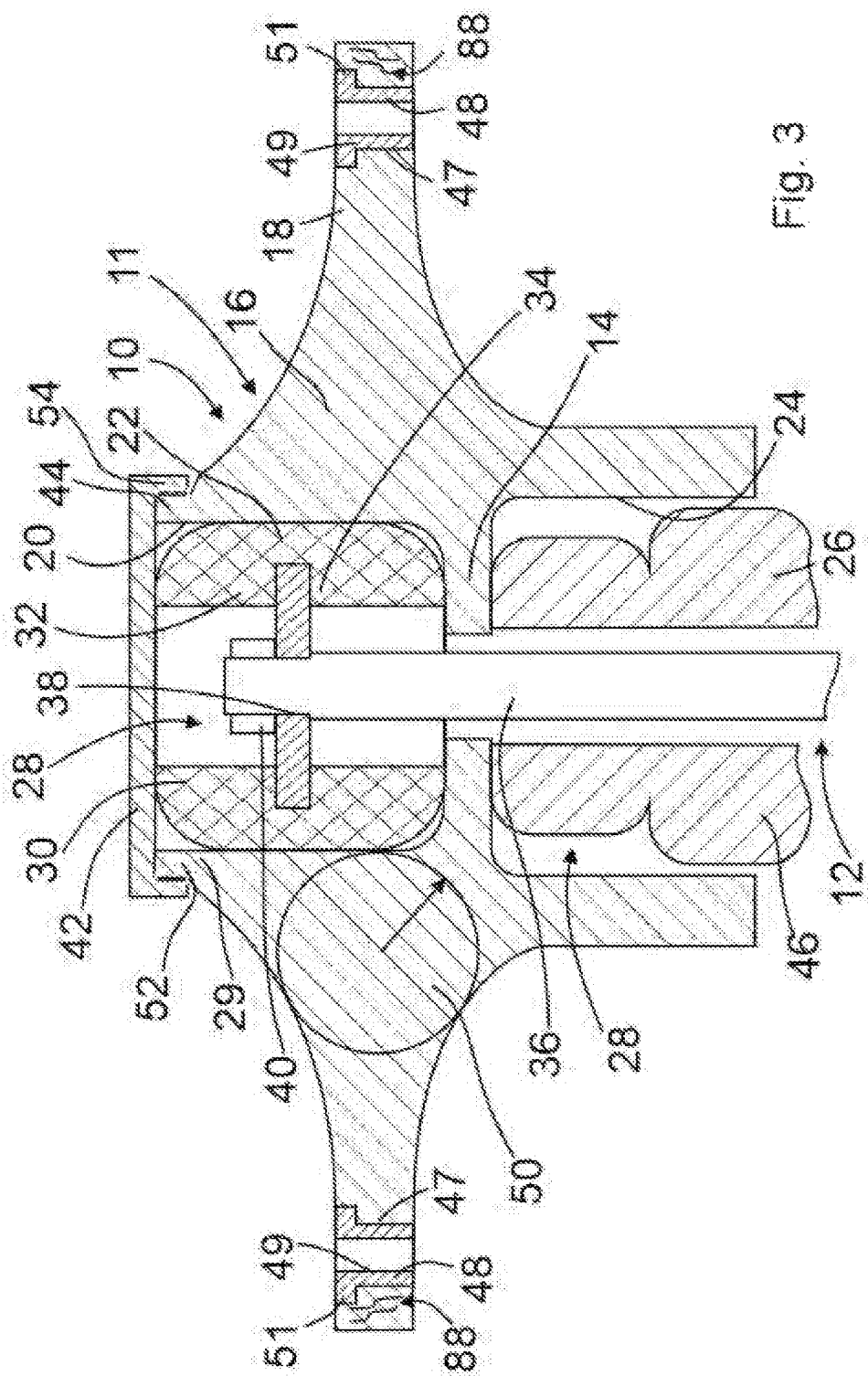
FIG. 3 shows a cross section through a bearing structural component according to a second embodiment.

FIG. 3 shows a second embodiment of the bearing structural component 10, which differs from the first embodiment in that the cover element 42 engages around the edge portion 44. The cover element 42 is welded to the edge portion 44 by laser plastic transmission welding, in that the edge portion 44 has high laser absorptance and a collar portion 54 of the cover element 42 has high laser transmittance. This structure makes it possible, for example, to reinforce the structural component with carbon fibers, which naturally causes it to lose its laser transparency.

Since a very high glass fiber content counteracts the transparency, this structure simplifies the weldability. The thin, preferably 4 mm thick, laser-transparent collar portion 54 is integrated in the cover element 42. The corresponding welding surface on the bearing structural component 10 may consequently be located on a thicker wall. This is advantageous for the injection molding operation of the bearing structural component 10, and also makes it possible to set a higher porosity. This is due to the fact that, in foam injection molding, injection is frequently performed at the thinnest point rather than at the thickest point. The bearing structural component 10 is then targetedly underfilled. Complete filling is achieved by the foam-induced expansion of the melt. Because the first local portion 52 is thicker in comparison to FIG. 1, it can only be filled at completion, resulting in greater flexibility with regard to the position of the injection point.

Figure 4:
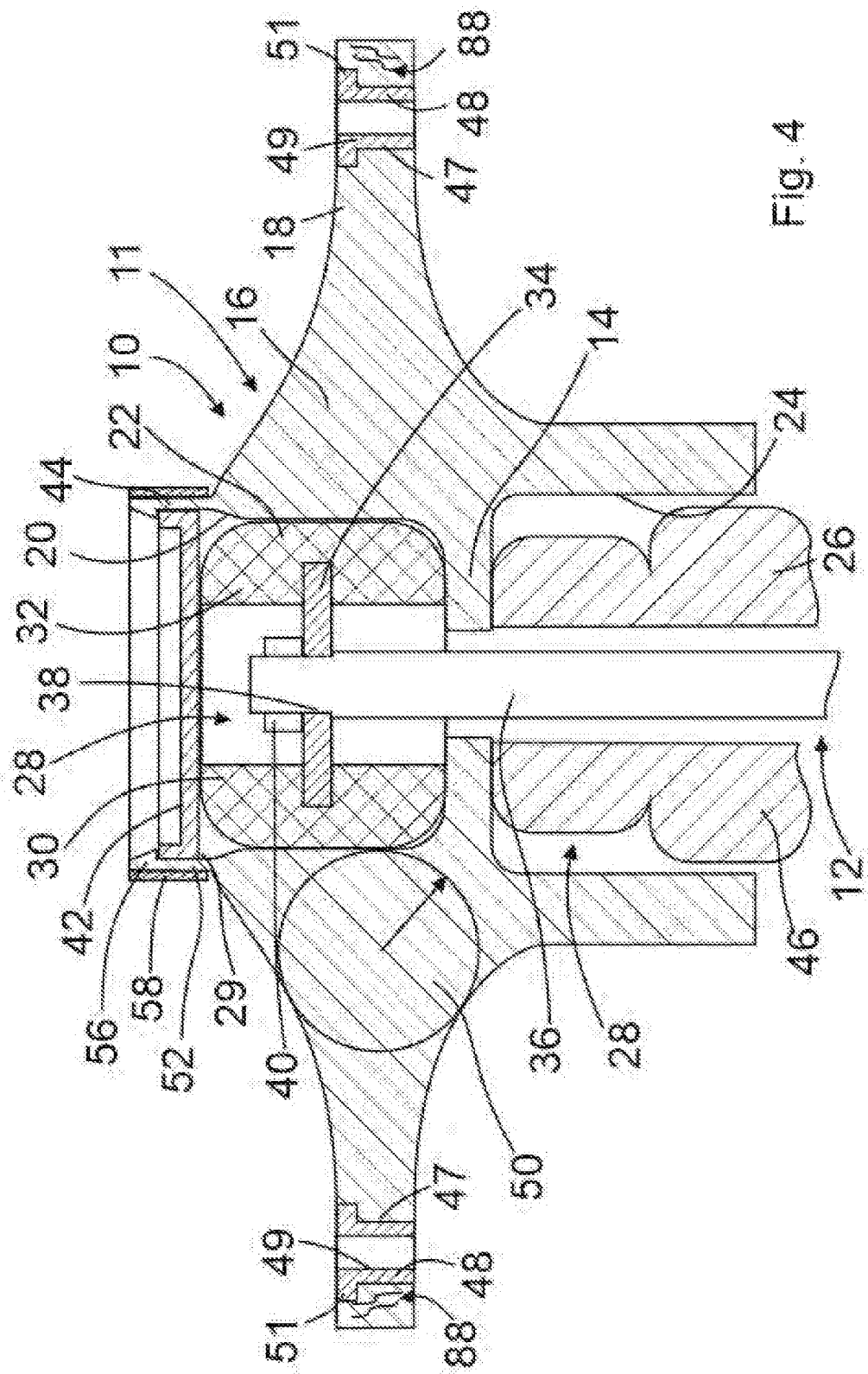
FIG. 4 shows a cross section through a bearing structural component according to a third embodiment.

FIG. 4 shows a third embodiment of the bearing structural component 10, which differs from the other embodiments in that the cover element 42 is connected to the bearing structural component 10 by a clip connection. For this, around the inner circumference the edge portion 44 has snap-fit elements 56, which hold the cover element 42. To fix the snap-fit elements 56, a fixed ring element 56, for example a metal ring, is pushed over the snap-fit elements 56 from the outside so that they are held in position under load.

Figure 5:
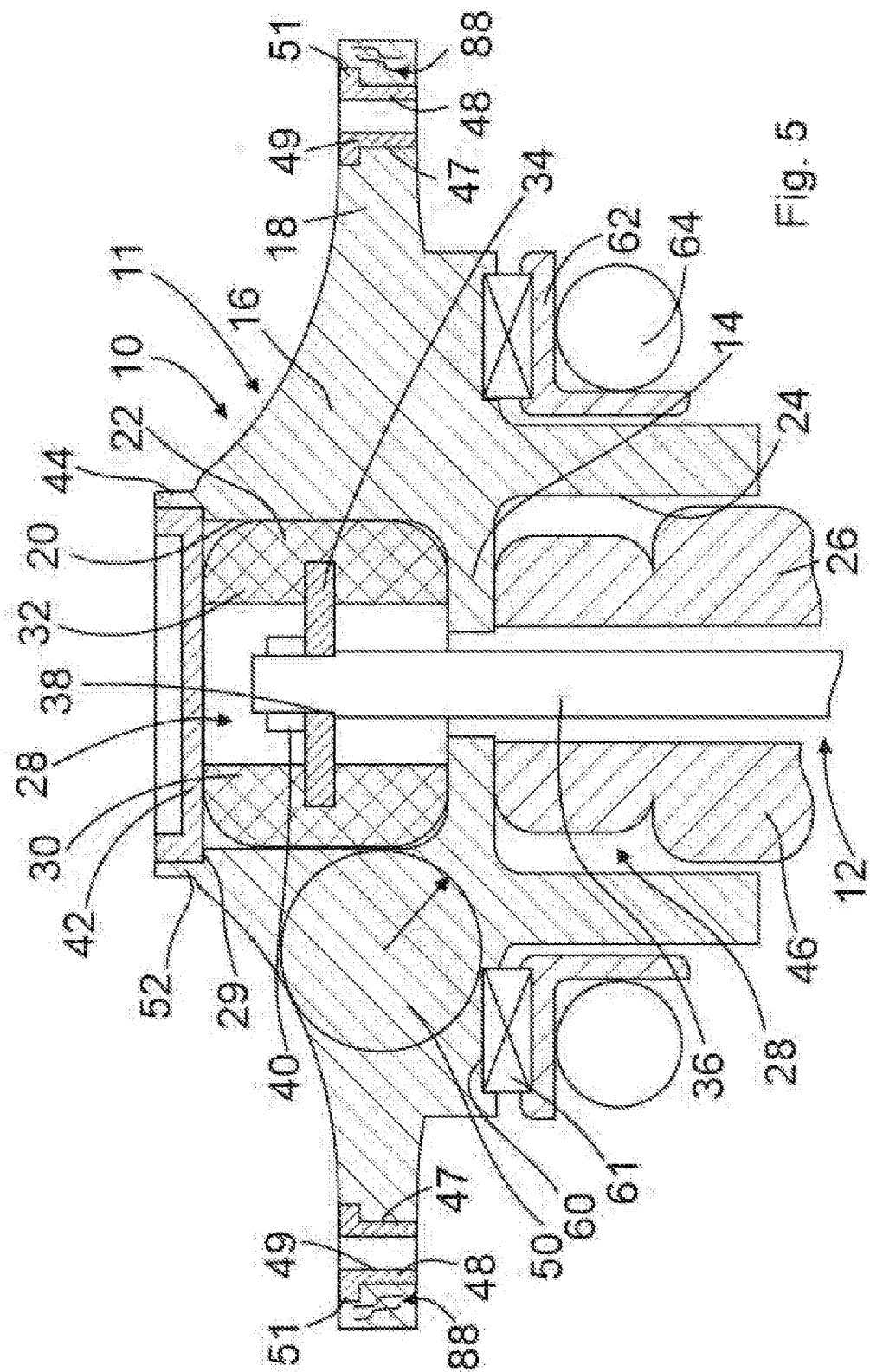
FIG. 5 shows a cross section through a bearing structural component according to a fourth embodiment.

FIG. 5 shows a fourth embodiment of the bearing structural component 10, which differs from the other embodiments in that a bearing seat 60 for a plain or ball bearing 61 is provided. This fixes a spring support 62, intended for supporting a spring element 64, with a rotational degree of freedom. As a result, the spring support 62 can be rotatably supported in relation to the bearing structural component 10. The top mount shown in FIG. 4 is used, for example, in a McPherson front axle or in steered rear axles.

Figure 6:
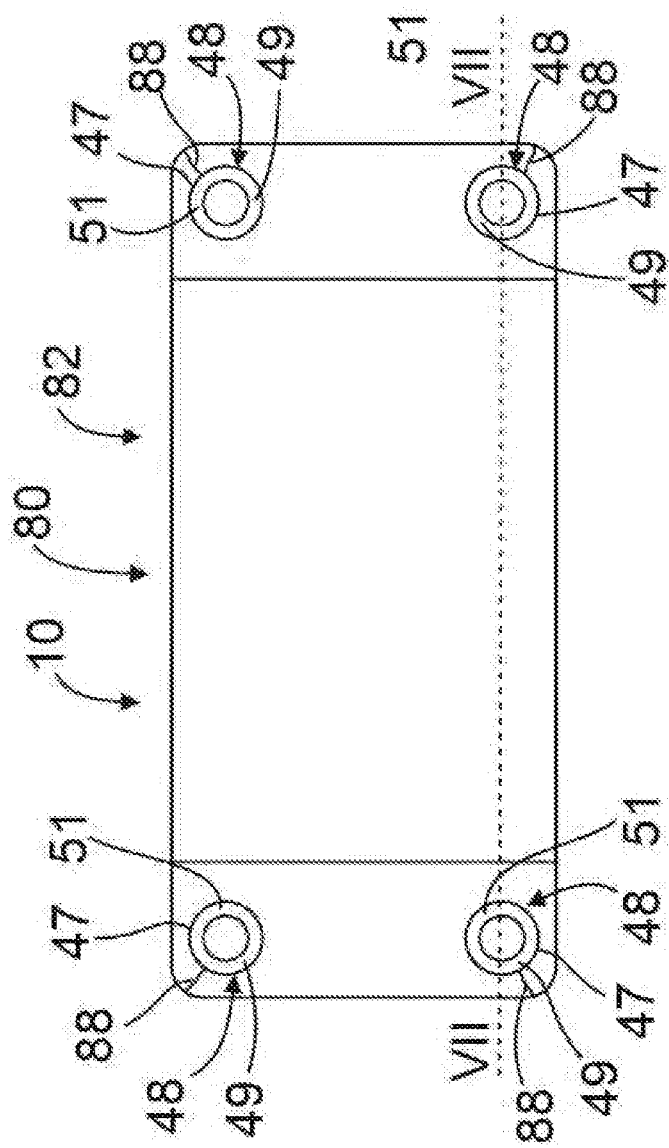
FIG. 6 shows a plan view of a bearing structural component according to a fifth embodiment.
Figure 7:
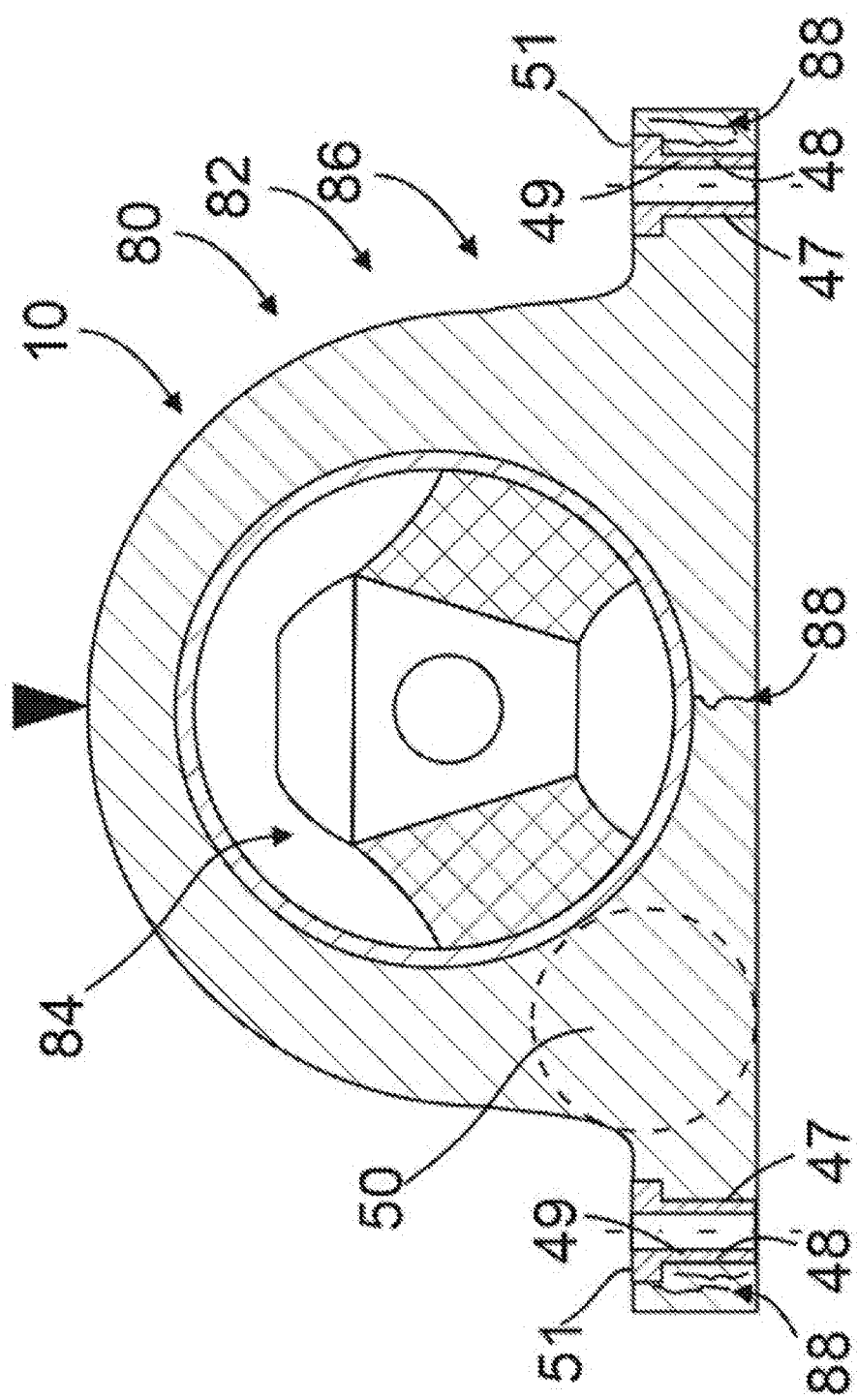
FIG. 7 shows a cross section through the bearing structural component illustrated in FIG. 6 along the line VII-VII.

FIGS. 6 and 7 show a fifth embodiment of the bearing structural component 10, which is in the form of an assembly bearing housing 80 of an assembly bearing 82. Apart from the assembly bearing housing 80, the assembly bearing 82 has a bearing 84 in the form of an elastomer bearing 86 and two connecting elements 48 in the form of sleeves 49 and serves to attach a motor vehicle drive, which is not illustrated, such as an internal combustion engine or an electric motor, for example, to a vehicle bodyshell, which is not illustrated, or to a vehicle part, which is not illustrated. The assembly bearing may be an engine bearing, for example. The elastomer bearing 86 and the sleeves 49 are inserted, in particular pressed, in through-openings 47.

As can be seen in FIGS. 6 and 7, weld line zones 88, which are produced at the confluence zone of the foamed plastic, are formed in the region of the through-openings 47. The weld line zones 88 are produced behind the through-openings 47 as seen from the injection point for the foamed plastic, which is illustrated in the present case as a triangle. The strength of these weld line zones 88 is enhanced by the low viscosity of the foamed plastic due to the foamed plastic containing gas, which allows a faster filling time.

As can also be seen in FIG. 6, the bearing structural component 10 which is in the form of an assembly bearing housing 80 has a first local portion 50 with a wall thickness of greater than 10 mm, in particular greater than 20 mm. Due to the large wall thickness, the area moment of inertia, which determines the flexural stiffness, is very high, with the result that the component stiffness with respect to flexural loading of the bearing structural component 10 is very high.

Figure 8:
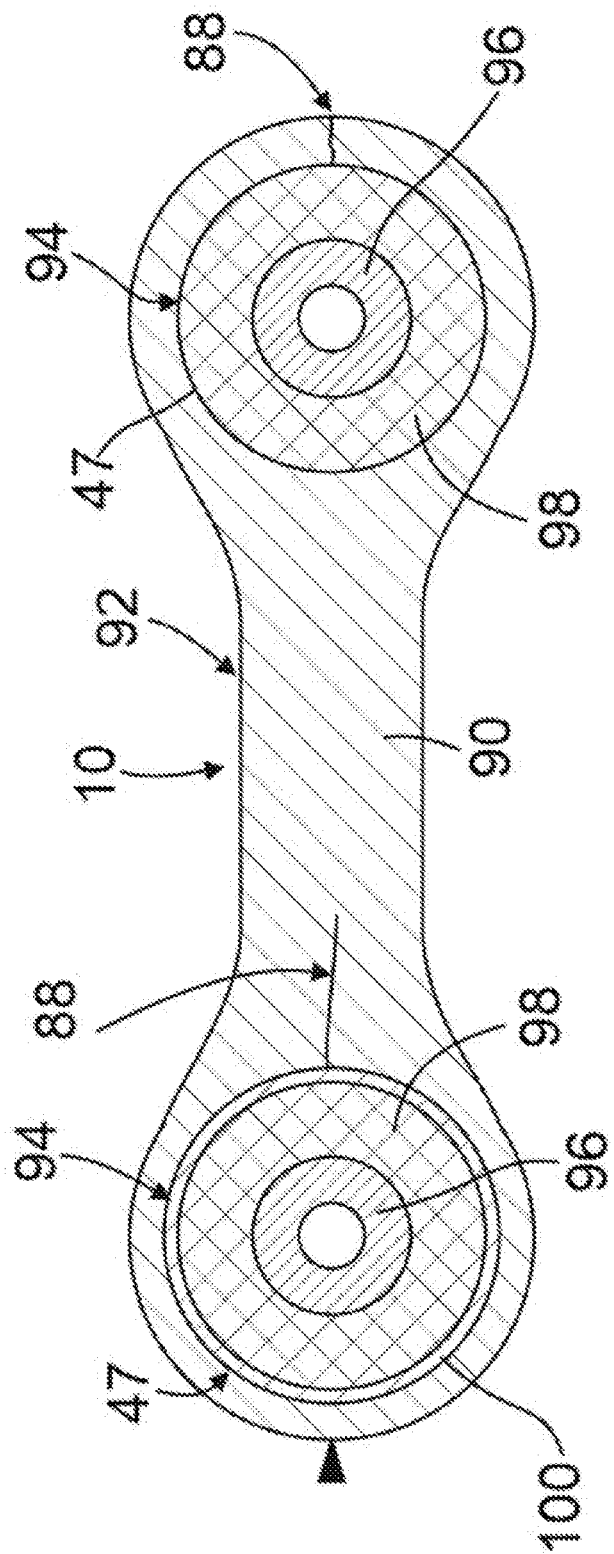
FIG. 8 shows a longitudinal section through a bearing structural component according to a sixth embodiment.

FIG. 8 shows a sixth embodiment of the bearing structural component 10, which is in the form of an link housing 90 of a link 92. Apart from the link housing 90, the link 92 has two bearings 84 which are inserted, in particular pressed or embedded by ultrasound, in through-openings 47.

Both bearings 84 are designed as elastomer bushings 94 and have a core 96 and an elastomer body 98 surrounding the core. As can be seen in FIG. 8, the left-hand elastomer bushing 94 also has an outer sleeve 100 which is made of metal and surrounds the elastomer body 98.

As can also be seen in FIG. 8, weld line zones 88, which are produced behind the through-openings 47 as seen from the injection point, are formed in the region of the through-openings 47. The strength of these weld line zones 88 is increased by virtue of the improved flow behavior of the foamed plastic.

Despite bring produced by the MuCell method, the bearing structural component 10 for automotive construction has large wall thicknesses of greater than 10 mm, preferably greater than 20 mm, which local porosities of greater than 10%, preferably greater than 20%, in combination with compact covering layers of at least 2 mm with a porosity of less than 10%, which means that high flexural stiffness combined with little material usage can be achieved.

The invention claimed is:

1. A bearing structural component for a bearing of a vehicle, the bearing structural component comprising foamed plastic and at least one through-opening for receiving a connecting element or a bearing, wherein the foamed plastic forms an integral foam structure having at least one through-opening for receiving a connecting element or a bearing, and a first local portion of the integral foam structure has a wall thickness of greater than 4 mm; wherein the integral foam structure has three or four through-openings for receiving connecting elements, the bearing structural component has one or two through-openings for receiving a respective bearing, and wherein each through opening has at least one weld line in a weld line zone.

2. The bearing structural component as claimed in claim 1, wherein the first local portion has a wall thickness of greater than 10 mm.

3. The bearing structural component as claimed in claim 1, wherein the first local portion has a wall thickness of greater than 20 mm.

4. The bearing structural component as claimed in claim 1, wherein the integral foam structure has a first layer having a first porosity and a second layer having a second porosity, wherein the second layer is surrounded by the first layer, and wherein the first porosity is less than or equal to 10% and/or the second porosity is greater than 10%.

5. The bearing structural component as claimed in claim 4, wherein the second porosity is greater than 20%.

6. The bearing structural component as claimed in claim 1, wherein the integral foam structure has a second local portion which can be connected to a further component by a welding method.

7. The bearing structural component as claimed in claim 6, wherein the welding method comprises laser plastic transmission welding.

8. The bearing structural component as claimed in claim 6, wherein either the second local portion has high laser transmittance and a corresponding edge portion of the further component has high laser absorptance, or the second local portion has high laser absorptance and the corresponding edge portion of the further component has high laser transmittance.

9. The bearing structural component as claimed in claim 1, wherein the connecting element or the bearing is connected to the integral foam structure in a form-fitting, force-fitting and/or materially bonded manner.

10. The bearing structural component as claimed in claim 1, wherein the foamed plastic comprises a thermoplastic material.

11. The bearing structural component as claimed in claim 10, wherein the thermoplastic material is a fiber-reinforced thermoplastic material.

12. The bearing structural component as claimed in claim 1, wherein the integral foam structure is produced by the MuCell method.

13. The bearing structural component as claimed in claim 1, wherein the bearing structural component has a first receiving portion for receiving a first bearing element and/or a second receiving portion for receiving a second bearing element.

14. The bearing structural component as claimed in claim 1, including a first receiving portion for receiving a first bearing element and a second receiving portion for receiving a second element, and wherein at least one of the first bearing element and the second bearing element is connected to the bearing structural component in a form-fitting, force-fitting and/or materially bonded manner.

15. The bearing structural component as claimed in claim 13, wherein at least one of the first receiving portion and the second receiving portion can be closed by a cover element and/or ring element to secure the bearing element that is received in the receiving portion.

16. The bearing structural component as claimed in claim 1, wherein the bearing structural component is part of a bearing, an assembly bearing or engine bearing support arm, a link, a coupling rod, a hinged support or a transmission suspension, or is an attachment part for a bearing, or is a part that receives a bearing.

17. The bearing structural component as claimed in claim 1, wherein the bearing structural component is part of a top mount.

18. The bearing structural component as claimed in claim 1, wherein the bearing structural component is formed without ribs.

19. A vehicle bearing including a bearing structural component as recited in claim 1.

20. A bearing structural component for a bearing of a vehicle, the bearing structural component comprising foamed plastic and at least one through-opening for receiving a connecting element or a bearing, wherein the foamed plastic forms an integral foam structure having at least one through-opening for receiving a connecting element or a bearing, and a first local portion of the integral foam structure has a wall thickness of greater than 4 mm; wherein the integral foam structure has two or more through-openings for receiving connecting elements, the bearing structural component has one or two through-openings for receiving a respective bearing, and wherein each through opening has at least one weld line.

* * * * *